United States Patent
Sheikh et al.

(10) Patent No.: US 9,065,913 B2
(45) Date of Patent: Jun. 23, 2015

(54) SYSTEM AND METHOD PROVIDING MULTI-MODALITY INTERACTION OVER VOICE CHANNEL BETWEEN COMMUNICATION DEVICES

(71) Applicant: Tata Consultancy Services Limited, Mumbai (IN)

(72) Inventors: Imran Ahmed Sheikh, Thane (IN); Sunil Kumar Kopparapu, Thane (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 13/970,909

(22) Filed: Aug. 20, 2013

(65) Prior Publication Data

US 2014/0056418 A1  Feb. 27, 2014

(30) Foreign Application Priority Data

Aug. 23, 2012  (IN) .......................... 2449/MUM/2012

(51) Int. Cl.
*H04M 11/00* (2006.01)
*H04M 3/493* (2006.01)
*H04M 7/00* (2006.01)

(52) U.S. Cl.
CPC ............ *H04M 3/493* (2013.01); *H04M 7/0042* (2013.01); *H04M 2201/60* (2013.01); *H04M 2203/253* (2013.01)

(58) Field of Classification Search
CPC ............ H04M 2201/60; H04M 3/5307; H04L 12/5835
USPC ......... 379/88.01, 93.17, 201.01, 88.13, 88.23
See application file for complete search history.

(56) References Cited

U.S. PATENT DOCUMENTS 7,092,738 B2    8/2006  Creamer et al.
8,340,257 B1 *  12/2012 Paczkowski et al. ...... 379/93.17
2004/0203652 A1 10/2004 Yan
(Continued)

FOREIGN PATENT DOCUMENTS

EP        0981236 A1    2/2000

OTHER PUBLICATIONS

Avvenuti, M. et al., "Mobile visual access to legacy voice-based applications," Proceedings of the 6th International Conference on Mobile Technology, Application & Systems (Mobility '09), Article No. 62; ACM New York, NY, USA (2009).

*Primary Examiner* — Fan Tsang
*Assistant Examiner* — Van D Huynh
(74) *Attorney, Agent, or Firm* — Finnegan, Henderson, Farabow, Garrett & Dunner, LLP

(57) ABSTRACT

The present disclosure relates generally to interactive response systems, and more particularly to systems and methods for providing multi-modality interaction between communication devices. In one embodiment, a multi-modality interactive system is disclosed, comprising: a processor; and a memory storing processor-executable instructions comprising instructions to: obtain a request to initiate an interactive session with a communication device; obtain interactive session data for communication to the communication device; select a modality for the interactive session data, by analyzing one or more parameters associated with the interactive session data and the communication device; convert a format of the interactive session data according to the selected modality; and transmit the interactive session data in the converted format to the communication device.

19 Claims, 3 Drawing Sheets

(56) References Cited

U.S. PATENT DOCUMENTS

2007/0280456 A1* 12/2007 Vadlakonda et al. .... 379/201.01
2011/0286586 A1* 11/2011 Saylor et al. ............... 379/88.13
2014/0146953 A1* 5/2014 Sepic ......................... 379/88.23

\* cited by examiner

SYSTEM AND METHOD PROVIDING MULTI-MODALITY INTERACTION OVER VOICE CHANNEL BETWEEN COMMUNICATION DEVICES

PRIORITY CLAIM

This U.S. patent application claims priority under 35 U.S.C. §119 to: India Application No. 2449/MUM/2012, filed Aug. 23, 2012. The aforementioned application is incorporated herein by reference in its entirety.

TECHNICAL FIELD

The present disclosure relates generally to interactive response systems, and more particularly to systems and methods for providing multi-modality interaction between communication devices.

BACKGROUND

Interactive Voice Response (IVR) systems are widely deployed by companies to automate customer interactions through telephone calls in the areas like travel inquiry and booking, phone banking and trading, telecommunication service providers etc. There is increased use of IVR by enterprises to reduce the cost of general sales, service, inquiry and support calls to and from the company. The benefits of IVR systems include handling of large call volumes, reduction in cost and improved customer experience.

These automated telephone IVR systems facilitate answering customer calls by interacting with customers. These interactions are enabled by presenting the caller with a voice menu by playing voice prompts. Further the caller is expected to select a choice by pressing a key on the telephone keypad or by speaking a command into the telephone. Generally the information required by the caller is also played back as a voice prompt to the caller.

This kind of interface is referred to as the Voice User Interface (VUI). The information played in voice menus and voice prompts has to be listened and remembered by the user. This increases the cognitive load on the user. For example if a user calls a Telephone Banking IVR system and asks for his last five transactions, the Telephone Banking IVR system will continuously play the transaction details to the caller one after another. The user has to both listen and remember this lengthy information containing date and amount of transaction. The lengthier transaction makes it expensive to both the service provider and the user.

The IVR system interaction can be enhanced by presenting the user with a visual menu similar to the voice menu on his mobile phone. A text-enhanced voice menu system can provide a voice menu to the caller, and additionally send menu information in text form within a voice communication, where an enhanced telephone is used. This system separately stores the audio information for producing voice menu and the text information for producing text version of voice menu. Voice and text are communicated to the user by using two different paths for each of these modes of communication.

Another method provides a Interactive Voice and Video Response (IVVR) system by adding a video picture to the IVR systems. This technology improves the video picture experience for users and facilitates them to get to the needed information more quickly than using just a recorded voice menu. The IVVR system requires the user to make a 3G video call from a 3G mobile phone.

In one method, text information is sent from one mobile to another, transmitting via radio a series of dual tone multi-frequency (DTMF) tones corresponding to the selected character. This transmission occurs through voice channel. This method includes text transfer from mobile to mobile and does not include text transfer from IVR system to mobile.

SUMMARY

In one embodiment, a multi-modality interactive system is disclosed, comprising: a processor; and a memory storing processor-executable instructions comprising instructions to: obtain a request to initiate an interactive session with a communication device; obtain interactive session data for communication to the communication device; select a modality for the interactive session data, by analyzing one or more parameters associated with the interactive session data and the communication device; convert a format of the interactive session data according to the selected modality; and transmit the interactive session data in the converted format to the communication device.

In one embodiment, a multi-modality interaction method is disclosed, comprising: obtaining a request to initiate an interactive session with a communication device; obtaining interactive session data for communication to the communication device; selecting a modality for the interactive session data, by analyzing one or more parameters associated with the interactive session data and the communication device; converting a format of the interactive session data according to the selected modality; and transmitting the interactive session data in the converted format to the communication device.

In one embodiment, a non-transitory computer-readable medium is disclosed, storing computer-executable multi-modality interaction instructions comprising instructions to: obtain a request to initiate an interactive session with a communication device; obtain interactive session data for communication to the communication device; select a modality for the interactive session data, by analyzing one or more parameters associated with the interactive session data and the communication device; convert a format of the interactive session data according to the selected modality; and transmit the interactive session data in the converted format to the communication device.

It is to be understood that both the foregoing general description and the following detailed description are exemplary and explanatory only and are not restrictive of the disclosure, as claimed.

DETAILED DESCRIPTION

Some embodiments of the present disclosure, illustrating its features, will now be discussed. The words "comprising", "having", "containing", and "including", and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a", "an", and "the" include plural references unless the context clearly dictates otherwise. Although any systems, methods, apparatuses, and devices similar or equivalent to those described herein can be used in the practice or testing of embodiments of the present disclosure, the preferred, systems and parts are now described. In the following description for the purpose of explanation and understanding reference has been made to numerous embodiments for which the intent is not to limit the scope of the disclosure.

One or more components of the disclosure are described as modules for the understanding of the specification. For example, a module may include self-contained component in a hardware circuit comprising of logical gate, semiconductor device, integrated circuits or any other discrete component. The module may also be a part of any software programme executed by any hardware entity for example processor. The implementation of module as a software programme may include a set of logical instructions to be executed by the processor or any other hardware entity. Further a module may be incorporated with the set of instructions or a program by means of an interface.

The disclosed embodiments are merely exemplary of the disclosure, which may be embodied in various forms. The present disclosure relates to a system and method facilitating enhanced multi-modality interaction between communication devices or plurality of communication devices. The system and method may facilitate the conversion of data from one modality into other by analyzing various parameters associated with the corresponding communication device which is receiving the data. The converted data may be transmitted over a preset voice communication path in a network.

Figure 1:
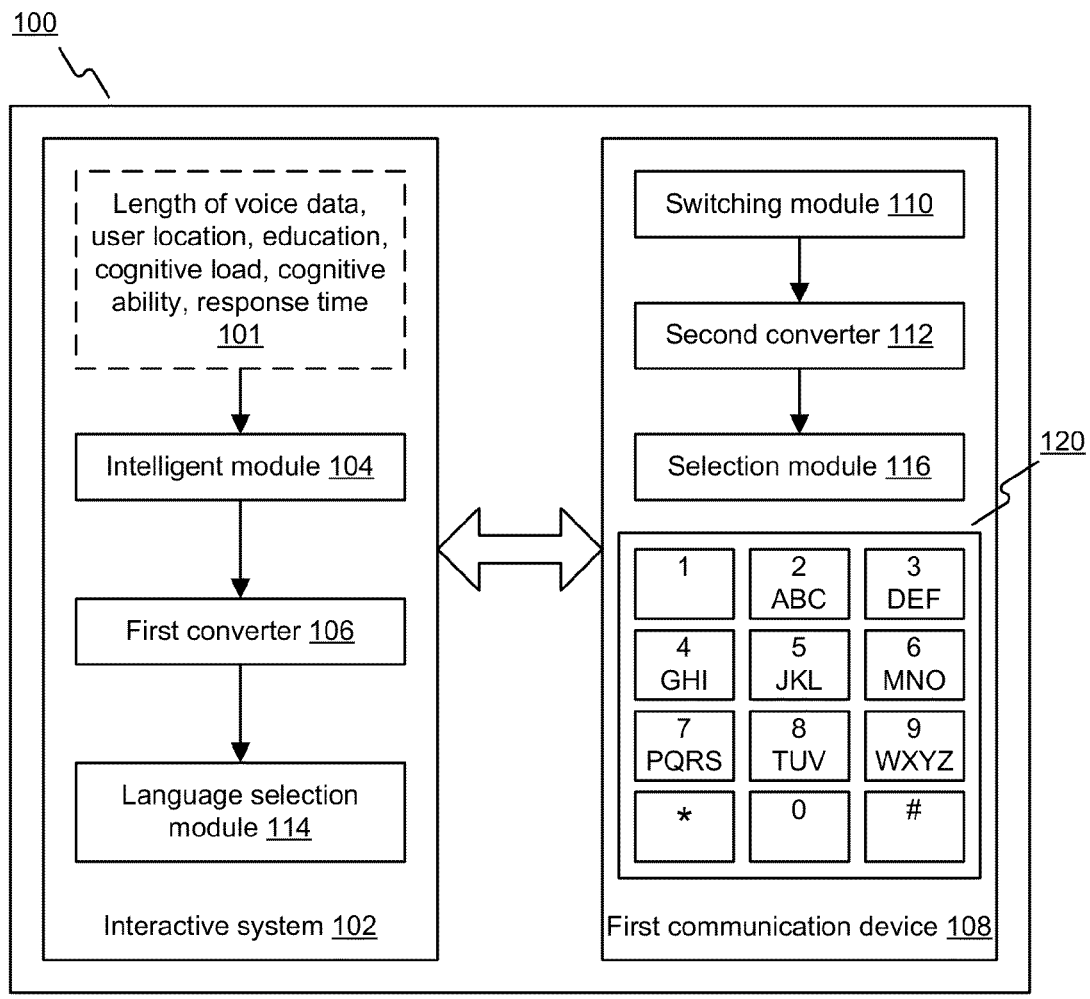
FIG. 1 illustrates the system architecture facilitating an enhanced multi-modality interaction between pluralities of communication devices in accordance with an embodiment of the disclosure.

In accordance with an embodiment, referring to FIG. 1, the system (100) may comprise an interactive system (102) configured to transmit a data to one or more communication devices over a preset voice communication path. The interactive system (102) may further comprise of an intelligent module (104) configured to determine and select a modality for the data to be transmitted and a first converter (106) for converting the data modality. The system (100) may further comprise a first communication device (108) requesting to initiate an interactive session with the interactive system (102). The first communication device (108) may further include a switching module (110) and a second converter (112) configured to reconvert the transmitted signals into the data.

In a communication network, one or more communication devices (first communication device) may send requests for an interaction with the interactive system (102). The interactive system (102) may include but is not limited to an IVR system, and the corresponding first communication device (108) may include a cell phone. A user through his first communication device (108) may request for an interaction with the interactive system (102) and obtain required information in a particular data modality. In the beginning, by way of specific example, the IVR system may play a voice menu which the user listens in order to choose a best/relevant option from the voice menu thus played.

In some embodiments, the interactive system (IVR system) may transmit the data (in a form of signal) in a continuous manner to the user of the first communication device (108). The interactive system (102) may be also capable of transmitting the data by changing its modality before transmission.

In some embodiments, the interactive system (102) may further comprise an intelligent module (104) which may select the modality of the data to be transmitted to the first communication device.

The intelligent module (104) may determine the modality of data to be transmitted to the corresponding communication device (first communication device) and may later select the determined modality for conversion of interactive session data. The interactive system (102) may transmit the data over a preset voice communication path, which may include but is not limited to a voice path. The modality of data transmitted may further comprise data in a voice menu, data in a text menu, data which may be converted into tactile feedback, etc.

When the intelligent module (104) selects the modality as text menu, the data may be converted into a DTMF sequence and transmitted via the voice channel to the user's communication device.

The intelligent module (104) may select the modality of the data to be transmitted by analyzing one or more parameters 101 associated with the first communication device (108). The parameters may include, but are not limited to, length of data (e.g., numbers of words played in a particular time, number of words to be transmitted in a text menu), cognitive ability of the user, location of a user, response time of a user, education of a user and usage statistics, etc. By analyzing these parameters, the intelligent module (104) may set a threshold value, and change the modality of the data if a cognitive load (of data transmission over the user) exceeds this threshold value. For example, if the voice menu plays 7 options for around 3 minutes, then the intelligent module (104) may set a threshold value (e.g., maximum time taken by the options should be less than 2 minutes), and when this threshold value is crossed, the intelligent module may select the modality of the data as text menu. Then the data may be transmitted as text to the user of the first communication device (108).

Further, the intelligent module (104) may be also configured to determine the amount of data which is to be converted into different modality and transmitted to the first communication device (108). The intelligent module (104) may either select the complete data for which the modality has to be changed, or a part of data for changing its modality. This selection may be further dependent on the parameters analyzed by the intelligent module (104), and may be associated with the corresponding communication devices.

The interactive system (102) may further comprise a first converter (106) communicating with the intelligent module (104) to change format of the data to be transmitted as per the selected modality. By way of non-limiting example, the first converter may include but is not limited to an audio signal encoder (DTMF encoder). The DTMF encoder may change the signals of data to be transmitted into a sequence of DTMF (Dual-Tone-Multi-Frequency) digits in order to change the modality of the data from voice menu to text menu.

In one embodiment, the interactive system (102) may further comprise a language selection module (114) configured to transmit the data in a language desired by the user or selected by the intelligent module (104) after analyzing the parameters associated with the first communication device (102). By way of non-limiting example, when the user of the first communication device (108) initiates the interaction with the interactive system (102), the intelligent module (104) may start analyzing the parameters associated with the first communication device (108) in order to select the suitable language for the data to be transmitted. After analyzing the region (location) from where the user has called, the intelligent module (104) may select the respective language corresponding to that region. For example, if a user calls from Maharashtra, the intelligent module (104) may select the language as Marathi for transmitting the data and also determine the modality of data which will be transmitted to the first communication device (108).

The data transmitted by the interactive system (102) may be now received by the user of the first communication device (108). The first communication device (108) may be provided with a switching module (110) in order to support the modality of the data thus transmitted by the interactive system (102).

The switching module (110) may receive the data in the form of the signals and identify its modality (voice menu, text menu, tactile feedback, etc.). Upon identification, the signals may be reconverted into the data by way of the second converter (112) present in the first communication device (108). By way of non-limiting example, the second converter (112) may further comprise a decoder to obtain the text data by any predictive text module, like T9 predictive text module. The decoder may again convert the DTMF digits into the text data which may be then displayed on the first communication device (108). This text data may be stored in the user's first communication device (108) for future reference.

The data may be transmitted by the interactive system (102) to the first communication device (108) over the voice channel in a radio frequency range.

In accordance with an embodiment, the first communication device (102) may further comprise a selection module (116) which may be configured to provide the user an option for selecting the modality of the data to be transmitted by the interactive system (102).

By way of non-limiting example, when the user selects the modality of the data to be transmitted as text menu, his selection may be again verified by the intelligent module (104) present in the IVR system. The intelligent module (104) may only accept the modality selection of the user by analyzing the parameters associated with the first communication device (108). The intelligent module (104) may accept the request of transmitting the data in text if the cognitive load exceeds a threshold value (in terms of voice menu length, number of options played etc). If the cognitive load is below the threshold value, the intelligent module (104) may not act on the user's request.

Further, the intelligent module (104) may automatically selects the modality of the data to be changed when again the cognitive load exceeds the threshold value and starts transmitting the data in text menu.

The user after receiving the data in the desired modality (voice or text) may select a relevant option. For example, in case of voice menu, the user may select the option either by speaking or by pressing a button provided in the first communication device (108). In case of text menu, the user may select his option again either by speaking or by pressing any button. Because of the text data, it may be easier for the user to remember all the options transmitted by the IVR system, which may reduce the chances of requesting for a call repetition by the user. Moreover, the user may refer to the menu thus transmitted via SMS for future reference.

The system and method illustrated for facilitating an enhanced multi-modality interaction between communication devices may be illustrated by working example stated in the following paragraph; the process is not restricted to the example only.

Figure 2:
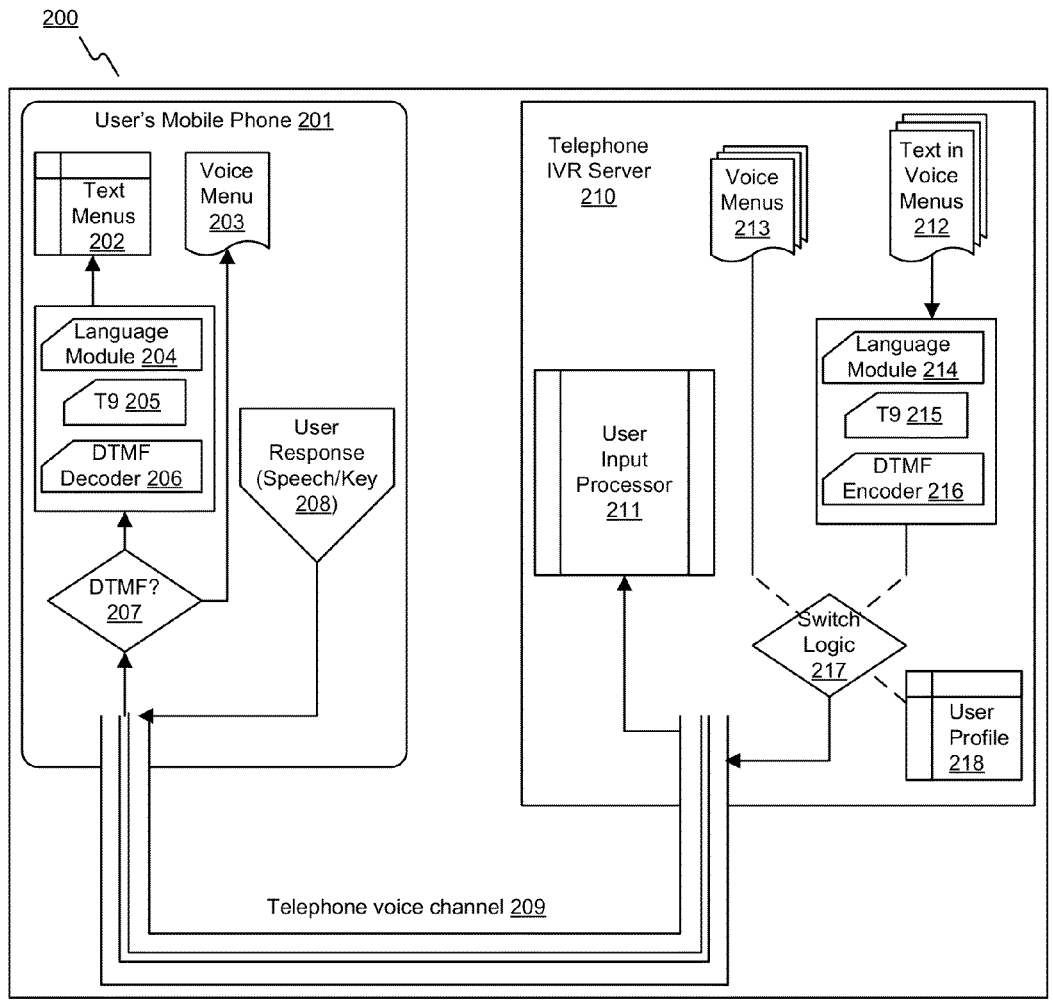
FIG. 2 illustrates the multi-modality interaction between an IVR system and a user through his cell phone in accordance with an exemplary embodiment of the disclosure.

With respect to an exemplary embodiment, as shown in FIG. 2, a typical voice call between the user mobile phone 201 and the Telephone IVR server 210 with the system 200 may iterate through the following steps.

In one aspect, the IVR system may have text information in the Voice Menu 212. It may encode the relevant text information into a sequence of DTMF digits, e.g., using DTMF encoder 216.

Relevant text information may imply, in some embodiments, that it is not necessary that the entire text in voice menus be converted to text menu. Instead minimal text representing the information may be converted to text menu. This may be identified by a selection module (not shown in FIG. 2), which may determine how much data has to be converted before transmission. For the said example of 'statement of account transactions' the prompt can be efficiently represented as the following text menu:

Withdrawal XX.XX <ddmmyy>.
Deposit XX.XX <ddmmyy>.
Withdrawal XX.XX <ddmmyy>.
Withdrawal XX.XX <ddmmyy>.
Deposit XX.XX <ddmmyy>.

If the voice menus and its text are not in English language then the language module 214 may transliterate the text menus into English language. The DTMF encoder 216 may encode the text menu into a DTMF sequence using a T9 predictive text module 215. For example, the keyword 'DEPOSIT' would be converted to the DTMF sequence '3376748'; derived using T9, from the text on the 9 keys of a telephone keypad as shown in FIG. 1. The IVR may send the sequence of DTMF digits to the user through the same voice call channel. The user's mobile phone 201 may detect if a particular DTMF digit sequence is sent by the IVR and if the DTMF sequence is detected, the user's mobile device, instead of prompting the user, may decode (see element 206) the DTMF sequence into a digit sequence. The digit sequence may be then converted back into text using a T9 predictive texting module 205. Additionally, if IVR menu is non-English then the text may be transliterated back into the respective language using language module 204. The text, which is the voice menu 203, may be then provided on the user's mobile phone screen. The user then responds through Speech or key press input 208, as supported by the Telephone IVR.

Figure 3:
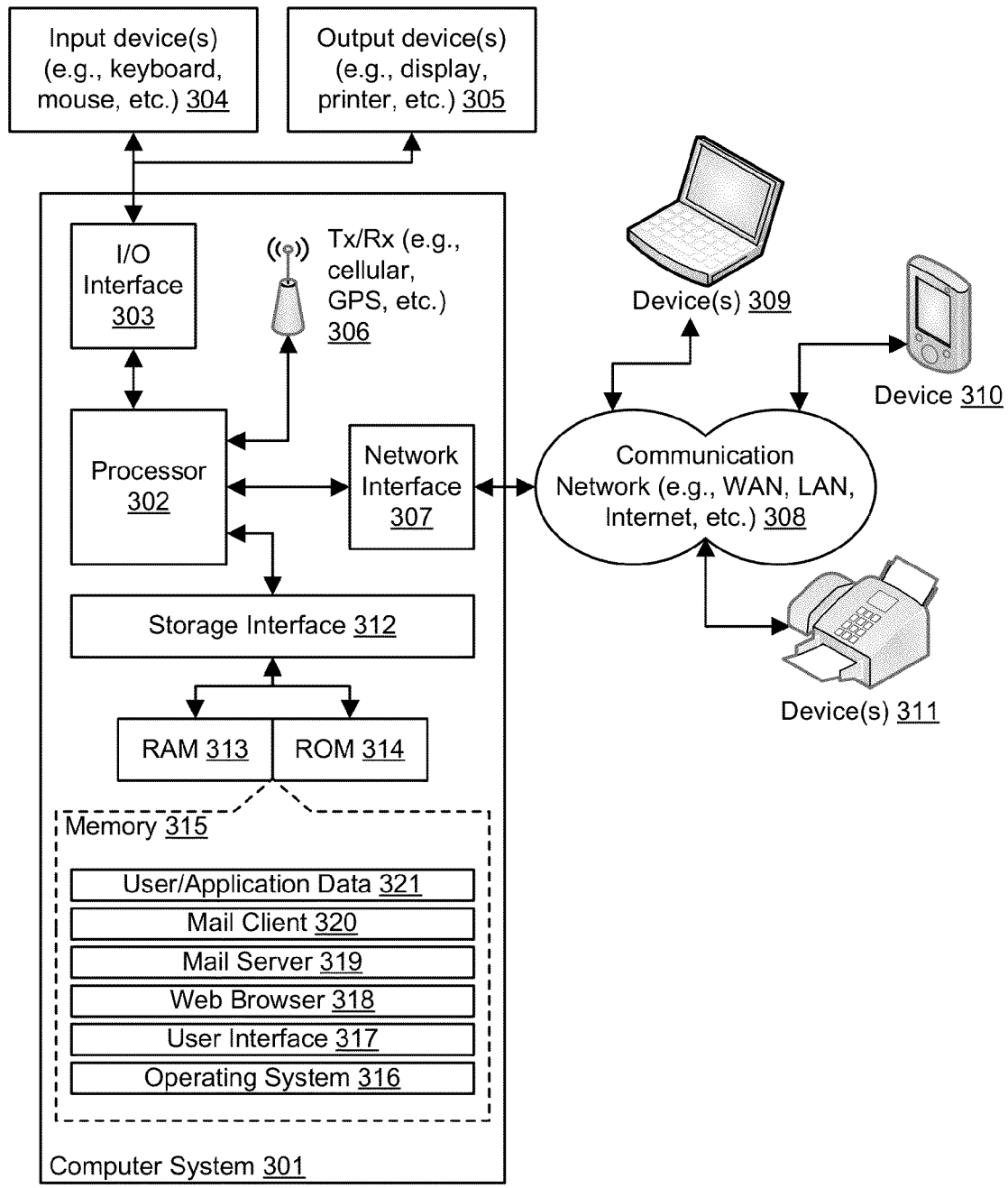
FIG. 3 is a block diagram of an exemplary computer system for implementing embodiments consistent with the present disclosure.

The system and method illustrated for facilitating an enhanced multi-modality interaction between communication devices may be illustrated by working example stated in the following paragraph; the process is not restricted to the said example only:

FIG. 3 is a block diagram of an exemplary computer system for implementing embodiments consistent with the present disclosure. Variations of computer system 301 may be used for implementing each component described in this disclosure. Computer system 301 may comprise a central processing unit ("CPU" or "processor") 302. Processor 302 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 302 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 302 may be disposed in communication with one or more input/output (I/O) devices via I/O interface 303. The I/O interface 303 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 303, the computer system 301 may communicate with one or more I/O devices. For example, the input device 304 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 305 may be a printer, fax machine, video display (e.g., cathode ray tube (CRT), liquid crystal display (LCD), light-emitting diode (LED), plasma, or the like), audio speaker, etc. In some embodiments, a transceiver 306 may be disposed in connection with the processor 302. The transceiver may facilitate various types of wireless transmission or reception. For example, the transceiver may include an antenna operatively connected to a transceiver chip (e.g., Texas Instruments WiLink WL1283, Broadcom BCM47501UB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 302 may be disposed in communication with a communication network 308 via a network interface 307. The network interface 307 may communicate with the communication network 308. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 308 may include, without limitation, a direct interconnection, local area network (LAN), wide area network (WAN), wireless network (e.g., using Wireless Application Protocol), the Internet, etc. Using the network interface 307 and the communication network 308, the computer system 301 may communicate with devices 310, 311, and 312. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 301 may itself embody one or more of these devices.

In some embodiments, the processor 302 may be disposed in communication with one or more memory devices (e.g., RAM 313, ROM 314, etc.) via a storage interface 312. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 316, user interface application 317, web browser 318, mail server 319, mail client 320, user/application data 321 (e.g., any data variables or data records discussed in this disclosure), etc. The operating system 316 may facilitate resource management and operation of the computer system 301. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 317 may facilitate display, execution, interaction, manipulation, or operation of program components through textual or graphical facilities. For example, user interfaces may provide computer interaction interface elements on a display system operatively connected to the computer system 301, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 301 may implement a web browser 318 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 301 may implement a mail server 319 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 301 may implement a mail client 320 stored program component. The mail client may be a mail viewing application, such as Apple Mail, Microsoft Entourage, Microsoft Outlook, Mozilla Thunderbird, etc.

In some embodiments, computer system 301 may store user/application data 321, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described systems and methods for providing multi-modality interaction between communication devices. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

We claim:

1. A multi-modality interactive system, comprising:
a processor; and
a memory storing processor-executable instructions comprising instructions to:
obtain a request to initiate an interactive session with a communication device over a voice communication path;
obtain an interactive session data for communication to the communication device wherein the interactive session data is obtained using an initial modality;
change the initial modality for the interactive session data, by analyzing one or more parameters associated with the interactive session data and the communication device;
convert a format of the interactive session data according to a changed modality; and
transmit the interactive session data in a converted format to the communication device via the interactive session over the same voice communication path.

2. The system of claim 1, wherein the communication device comprises:
a communication device processor; and
a communication device memory storing processor-executable instructions comprising instructions to:
recognize the initial modality of the transmitted interactive session data; and
provide the transmitted interactive session data for a user according to the recognized modality of the transmitted interactive session data.

3. The system of claim 1, wherein the initial modality or the changed modality is one of: voice; text; a tactile feedback; or a combination thereof.

4. The system of claim 1, wherein the one or more parameters include at least one of: a length of the interactive session data; a cognitive ability associated with a user, a location of a user; a response time of a user; an education of a user; or a usage statistic.

5. The system of claim 4, wherein the length of the interactive session data is measured using one of: a number of words to be played within a particular time; or a number of words to be transmitted in a text menu.

6. The system of claim 1, wherein the communication device is a mobile phone.

7. The system of claim 1, wherein the instructions to transmit the interactive session data includes instructions to:
transmit the interactive session data using a Dual-Tone-Multi-Frequency signal.

8. The system of claim 1, wherein the instructions to convert the format of the interactive session data include instructions to:
encode the interactive session data using a Dual-Tone-Multi-Frequency encoder.

9. The system of claim 2, wherein the communication device memory further stores instructions to:
decode the interactive session data; and
predict text according to at least partially decoded interactive session data.

10. The system of claim 1, the memory further storing instructions to:
convert a language associated with the interactive session data; and
wherein the instructions to transmit the interactive session data include instructions to:
transmit the interactive session data according to the converted language.

11. A multi-modality interaction method, comprising:
obtaining a request to initiate an interactive session with a communication device over a voice communication path;
obtaining an interactive session data for communication to the communication device, wherein the interactive session data is obtained using an initial modality;
changing the initial modality for the interactive session data, by analyzing one or more parameters associated with the interactive session data and the communication device;
converting a format of the interactive session data according to a changed modality; and
transmitting the interactive session data in a converted format to the communication device via the interactive session over the same voice communication path.

12. The method of claim 11, wherein the initial modality or the changed modality is one of: voice; text; a tactile feedback; or a combination thereof.

13. The method of claim 11, wherein the one or more parameters include at least one of: a length of the interactive session data; a cognitive ability associated with a user, a location of a user; a response time of a user; an education of a user; or a usage statistic.

14. The method of claim 13, wherein the length of the interactive session data is measured using one of: a number of words to be played within a particular time; or a number of words to be transmitted in a text menu.

15. The method of claim 11, wherein converting the format of the interactive session data includes:
   encoding the interactive session data using a Dual-Tone-Multi-Frequency encoder.

16. The method of claim 11, further comprising:
   converting a language associated with the interactive session data; and
   wherein transmitting the interactive session data includes:
      transmitting the interactive session data according to the converted language.

17. A non-transitory computer-readable medium storing computer-executable multi-modality interaction instructions comprising instructions to:
   obtain a request to initiate an interactive session with a communication device over a voice communication path;
   obtain an interactive session data for communication to the communication device using an initial modality;
   change the initial modality for the interactive session data, by analyzing one or more parameters associated with the interactive session data and the communication device;
   convert a format of the interactive session data according to a changed modality; and
   transmit the interactive session data in a converted format to the communication device via the interactive session over the same voice communication path.

18. The system of claim 1, wherein the format of the interactive session data is converted according to the changed modality when a cognitive load of data transmission exceeds a threshold value, wherein the threshold value is determined by analyzing the one or more parameters associated with the interactive session data and the communication device.

19. The method of claim 11, wherein the format of the interactive session data is converted according to the changed modality when a cognitive load of data transmission exceeds a threshold value, wherein the threshold value is determined by analyzing the one or more parameters associated with the interactive session data and the communication device.

* * * * *